(12) United States Patent
Taracko

(10) Patent No.: US 8,356,836 B2
(45) Date of Patent: Jan. 22, 2013

(54) VARIABLE LOAD KNEE BOLSTER

(75) Inventor: Matthew L. Taracko, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 12/420,530

(22) Filed: Apr. 8, 2009

(65) Prior Publication Data

US 2010/0259036 A1 Oct. 14, 2010

(51) Int. Cl.
*B60R 21/045* (2006.01)
(52) U.S. Cl. .......................... 280/748; 280/751; 280/752
(58) Field of Classification Search .................. 280/748, 280/751, 752; 188/371, 372
See application file for complete search history.

(56) References Cited

U.S. PATENT DOCUMENTS

| | | | | |
|---|---|---|---|---|
| 3,834,482 A | * | 9/1974 | Wada et al. .................. | 180/90 |
| 3,850,447 A | * | 11/1974 | Nagazumi et al. .......... | 280/752 |
| 3,930,665 A | * | 1/1976 | Ikawa .......................... | 280/751 |
| 4,893,834 A | * | 1/1990 | Honda et al. ................ | 280/751 |
| 5,037,130 A | * | 8/1991 | Okuyama ..................... | 280/752 |
| 5,273,314 A | * | 12/1993 | Sakakibara .................. | 280/752 |
| 5,482,319 A | | 1/1996 | Yoshimura et al. | |
| 5,518,270 A | | 5/1996 | Hanada et al. | |
| 5,573,272 A | * | 11/1996 | Teshima ....................... | 280/751 |
| 5,632,507 A | * | 5/1997 | Sinner et al. ................ | 280/751 |
| 5,720,510 A | * | 2/1998 | Daniel et al. ............. | 296/187.05 |
| 6,170,872 B1 | * | 1/2001 | Bair et al. .................... | 280/751 |
| 6,244,626 B1 | * | 6/2001 | Monaghan et al. .......... | 280/805 |
| 6,264,238 B1 | * | 7/2001 | MacDonald et al. ........ | 280/751 |
| 6,609,727 B2 | * | 8/2003 | Figlioli et al. ............... | 280/752 |
| 6,783,156 B2 | * | 8/2004 | Chickmenahalli et al. ... | 280/752 |
| 6,905,136 B2 | * | 6/2005 | Vidal et al. .................. | 280/752 |
| 7,128,339 B2 | * | 10/2006 | Mani ............................ | 280/752 |
| 7,185,917 B2 | * | 3/2007 | Nagata et al. ............... | 280/748 |
| 7,338,075 B2 | | 3/2008 | Ellison et al. | |
| 7,354,065 B2 | | 4/2008 | Muramatsu et al. | |
| 7,393,012 B2 | | 7/2008 | Funakura et al. | |
| 7,404,593 B2 | * | 7/2008 | Cormier et al. .......... | 296/187.03 |
| 7,441,806 B2 | | 10/2008 | Ellison | |
| 7,735,865 B2 | * | 6/2010 | Cappabianca et al. ....... | 280/752 |
| 2003/0034672 A1 | * | 2/2003 | Nagy ....................... | 296/203.02 |
| 2003/0057692 A1 | * | 3/2003 | Horsch et al. ................ | 280/752 |
| 2004/0056463 A1 | * | 3/2004 | Marks et al. ................. | 280/752 |
| 2004/0124623 A1 | * | 7/2004 | Yamazaki .................... | 280/752 |
| 2005/0194773 A1 | * | 9/2005 | Yamada et al. .............. | 280/752 |
| 2006/0038390 A1 | * | 2/2006 | Cho ............................ | 280/752 |
| 2008/0012279 A1 | * | 1/2008 | Ellison et al. ................ | 280/752 |

FOREIGN PATENT DOCUMENTS

JP 7-61307 * 3/1995

* cited by examiner

*Primary Examiner* — Toan To
*Assistant Examiner* — George Spisich
(74) *Attorney, Agent, or Firm* — Rankin Hill & Clark LLP

(57) ABSTRACT

A knee bolster for mounting within a vehicle includes a curved bracket mounted to an associated cross beam of the vehicle. The knee bolster further includes a knee panel member mounted to the curved bracket at a location spaced from the associated cross beam. The knee panel member exhibits a variable load response for a contact location when the contact location varies between a lower portion of the knee panel member and an upper portion of the knee panel member.

19 Claims, 3 Drawing Sheets

VARIABLE LOAD KNEE BOLSTER

BACKGROUND

The present disclosure generally relates to knee bolsters used in vehicles to protect the knees of vehicle occupants, such as during a collision or a crash.

It is well known to use a knee bolster on or adjacent a vehicle dashboard, such as on either side of the steering column extending from the dashboard. It is also known to attempt to control crush (i.e., deflection relative to impact force) of a knee bolster. Known knee bolsters include stepshaped knee bolsters or knee bolsters having walls with varying widths to control the rate of crush.

In some conventional knee bolsters, two components are employed to provide the knee bolster with a two-stage loading response. For example, a first component having a U-shape can be secured to a cross member of the vehicle and a second component, such as a pad, can be secured to an opposite side of the U-shaped component. The two-stage loading includes a first, low load, stage involving bending of the second component and a second, high load, stage involving bending of the U-shaped component. One drawback of such conventional knee bolsters is the lack of optimization for larger occupants who would be better served by receiving a higher load response sooner during an impact or collision event, rather than later (e.g., after the first step is complete).

SUMMARY

In accordance with one aspect, an improved knee bolster is provided for mounting within a vehicle. More particularly, in accordance with this aspect, the improved knee bolster includes a curved bracket mounted to an associated cross beam of the vehicle and a knee panel member mounted to the curved bracket at a location spaced from the associated cross beam. The knee panel member exhibits a variable load response for a contact location when the contact location varies between a lower portion of the knee panel member and an upper portion of the knee panel member.

In accordance with another aspect, an improved vehicle knee bolster is provided. More particularly, in accordance with this aspect, the improved vehicle knee bolster includes a cross member extending laterally across a vehicle and a U-shaped member having a first leg secured to the cross member. A secondary member is secured to a second leg of the U-shaped member. The secondary member has an upper portion and a lower portion with stiffness varying between the upper and lower portions.

In accordance with still another aspect, another improved knee bolster is provided. More particularly, in accordance with this aspect, the knee bolster includes a curved member having one end secured to a cross member and a second end spaced apart from the cross member. The knee bolster further includes a secondary member secured to the second end of the curved member. The secondary member has variable strength along a generally vertical dimension thereof to transmit a corresponding varying load to the curved member when an impact force is received by the secondary member.

DETAILED DESCRIPTION

Figure 1:
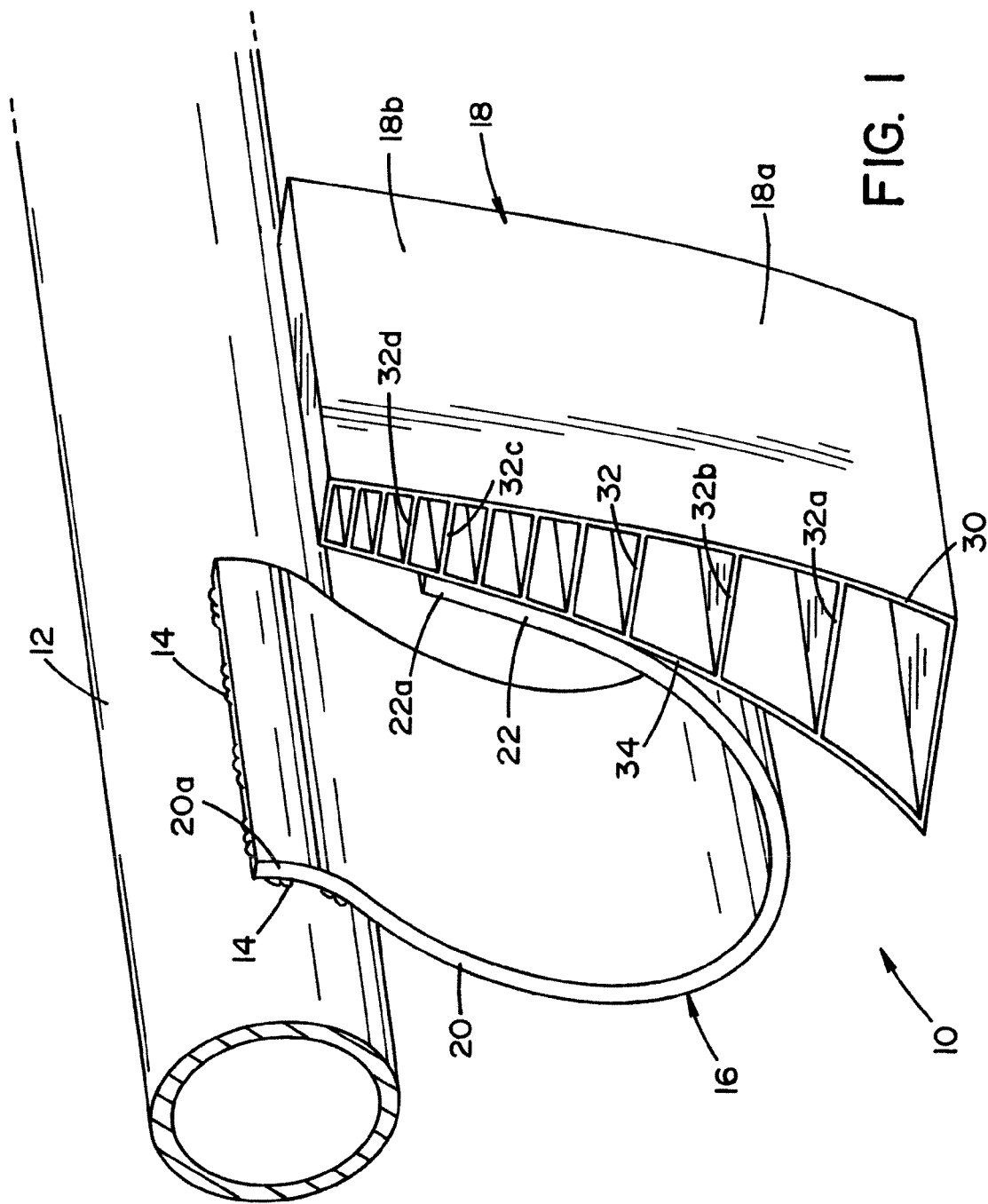
FIG. 1 is perspective view of a knee bolster according to an exemplary embodiment of the invention mounted to a cross beam of a vehicle.

Referring now to the drawings wherein the showings are for purposes of illustrating one or more exemplary embodiments, a knee bolster for mounting within a vehicle is depicted in FIG. 1 and generally indicated by reference numeral 10. As is known and understood by those skilled in the art, the knee bolster 10 can be secured to a cross beam or member 12 of a vehicle and oriented such that the knee bolster can extend toward a passenger compartment of the vehicle. This protects a vehicle occupant's knee or knees in the event that the occupant's knee or knees are forcibly moved into the area of the vehicle occupied by the knee bolster, as can occur during, or resulting from, a vehicle collision. As illustrated, the knee bolster 10 can be secured to the cross beam 12 by welding 14, or any other known means or connection type.

The knee bolster 10 includes a curved member or bracket 16, which can be directly mounted to the cross beam 12, and a knee panel member 18, which can be directly mounted to the curved bracket at a location spaced from the cross beam 12. As will be described in more detail below, the knee panel member 18 can be configured to exhibit a variable load response for a contact location when the contact location varies between a lower portion 18a of the knee panel member and an upper portion 18b of the knee panel member. The curved bracket 16 and the knee panel member 18 can have profiles (i.e., cross-sections) that enable both components 16, 18 to be extrudable such that, in the illustrated embodiment, the bracket 16 is an extrudable bracket and the knee panel member 18 is an extrudable knee panel.

Figure 2:
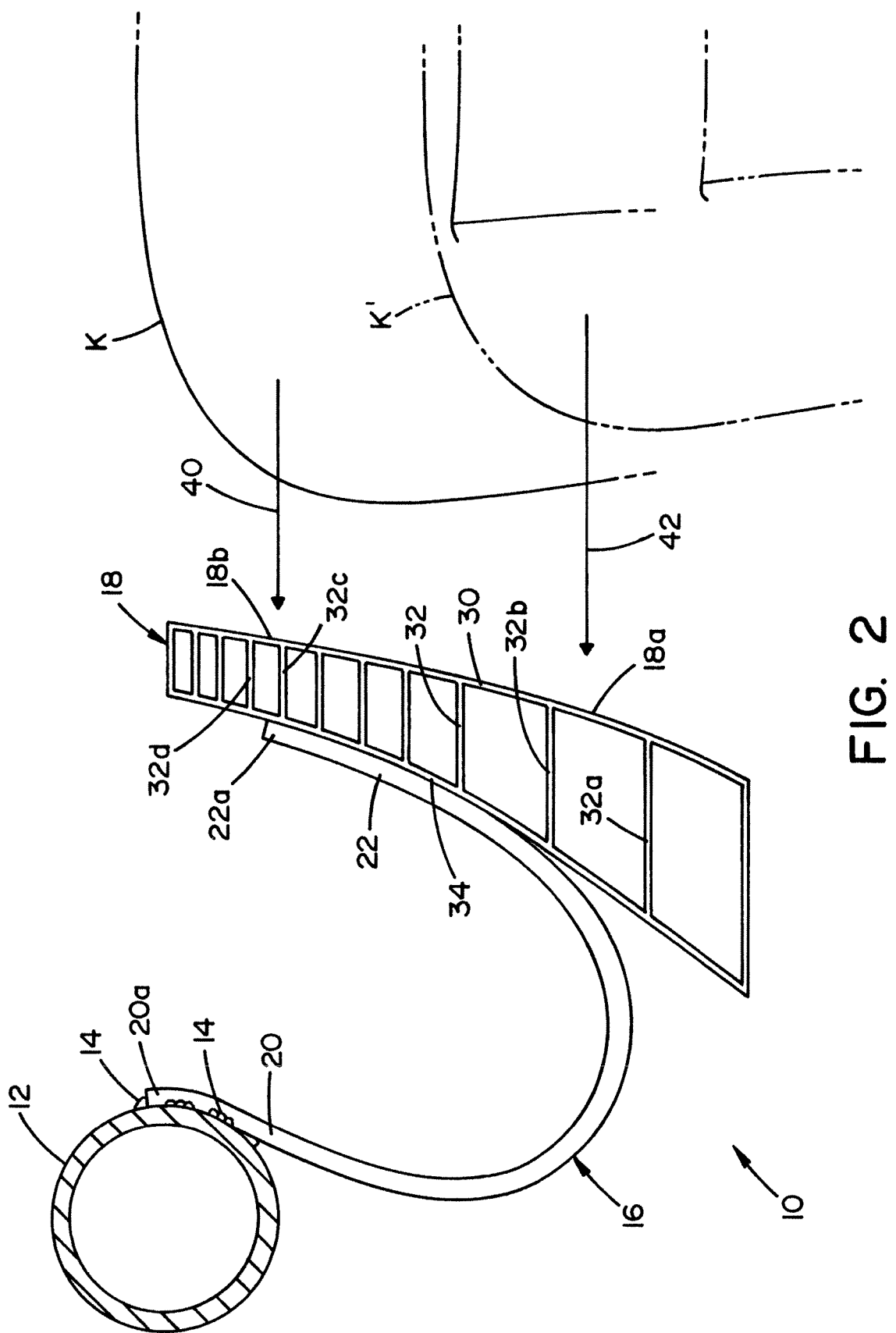
FIG. 2 is cross-sectional view of the knee bolster of FIG. 1 showing knees of a vehicle occupant in spaced and opposed relation to the knee bolster.

With additional reference to FIG. 2, the construction or configuration of the knee bolster 10 will now be described in more detail. As shown, the curved bracket 16 has a U-shape and can be formed of metal (e.g., steel), though this is not required. In particular, the curved bracket 16 has a first leg 20 secured to the cross member 12, which itself can extend laterally across the vehicle. In the illustrated embodiment, an end 20a (or a portion adjacent end 20a) of the first leg 20 is secured to the cross member 12. The curved bracket 16 also includes a second leg 22 having an end 22a that is spaced apart from the cross member 12. The knee panel member 18, which is also referred to herein as a secondary member, is secured to the second leg 22, and the end 22a, of the curved bracket 16. The knee panel member 18 can be formed of plastic (though this is not required) and can be secured to the second leg 22 via any known means or connection type. For example, the knee panel member 18 can be adhered to the curved bracket 16 via an adhesive, can be secured via integrally molded connectors (not shown), etc.

In the illustrated embodiment, the knee panel member 18 includes a contact wall 30 spanning between and beyond the lower and upper portions 18a, 18b for receiving an impact force at the contact location. Knee panel member 18 further includes a plurality of spaced apart ribs 32 disposed between the contact wall 30 and the curved bracket 16, particularly the second leg 22 of the curved bracket 16. As will be described in more detail below, the plurality of ribs 32 can be configured to provide the knee panel member 18, and thus the knee bolster, with the variable load response. For example, the ribs 32 can be configured such that the upper portion 18b of the knee panel member exhibits a higher load response and the lower portion 18a exhibits a lower load response. The knee panel member 18 of the illustrated embodiment further includes a mounting wall 34 spaced apart from the contact wall 30 and secured to the curved bracket 16, and particularly to the second leg 22 thereof. As shown, the plurality of ribs 32 extend between the contact wall 30 and the mounting wall 34.

To provide the higher load response and lower load response, respectively, at the upper portion 18b and the lower portion 18a, stiffness of the knee panel member 18 can vary between the lower and upper portions 18a, 18b. In particular, the upper portion 18b can have an increased stiffness relative to the lower portion 18a. This results in the upper portion 18b transmitting more of an impact load to the curved bracket 16 when the impact load is received on the upper portion 18b and the lower portion 18a transmitting less of the impact load to the curved bracket 16 when the impact load is received on the lower portion 18a. This varying stiffness can be provided by the ribs 32, which extend transversely in a direction generally parallel to the cross member, in addition to extending between the contact and mounting walls 30, 34. In particular, the ribs 32 are spaced apart from one another and configured to increase stiffness of the upper portion 18b relative to the lower portion 18a.

In the illustrated embodiment, the ribs 32 are configured by varying a spacing between adjacent ribs such that the ribs adjacent the upper portion 18b are spaced apart less than ribs adjacent the lower portion 18a. Thus, for example, at least two ribs 32a, 32b adjacent the lower portion 18a are spaced apart a greater distance than at least two ribs 32c, 32d adjacent the upper portion 18b. In the illustrated embodiment, the plurality of ribs 32 are distributed along the knee panel member 18 and the variable spacing between adjacent ones of the ribs 32 progressively decreases from the lower portion 18a to the upper portion 18b. This results in a higher concentration of the ribs 32 being disposed adjacent the upper portion 18b than adjacent the lower portion 18a. As a result, the knee panel member 18 has a variable strength along a generally vertical dimension thereof to transmit a corresponding varying load to the curved bracket 16 when an impact force is received by the knee panel member 18. That is, the higher concentration of ribs at the upper portion 18b provides increased strength at or toward the upper portion 18b and reduced strength at or toward the lower portion 18a.

Varying strength or stiffness along the vertical dimension of the knee panel member 18, such as at the lower portion 18a and at the upper portion 18b, advantageously allows the knee panel member 18 to exhibit different load responses when the contact location is at or near the lower portion 18a than when the contact location is at or near the upper portion 18b. For example, when a larger or taller occupant is seated opposite the knee bolster, this occupant's knee K can be generally aligned so as to hit at or near the upper portion 18b during a collision event, as indicated by arrow 40. In contrast, as shown in phantom, when a smaller or shorter occupant is seated opposite the knee bolster 10, this occupant's knee K' is aligned so as to hit at or near the lower portion 18a during a collision event, as indicated by arrow 42. The effect of this arrangement is that knee K would receive a higher force level and knee K' would receive a lower force level due to the varying strength or stiffness of the knee panel member 18 along its vertical height. In other words, when knee K strikes the knee bolster, the contact location is likely to be at or near the upper portion 18b where the rib pitch is greatest (i.e., the spacing between the ribs is smaller) and thus the load is high. When the knee K' impacts the knee panel member 18, the contact location is likely to be at or near the lower portion 18a where the rib pitch is less and thus the load will be lower.

Figure 3:
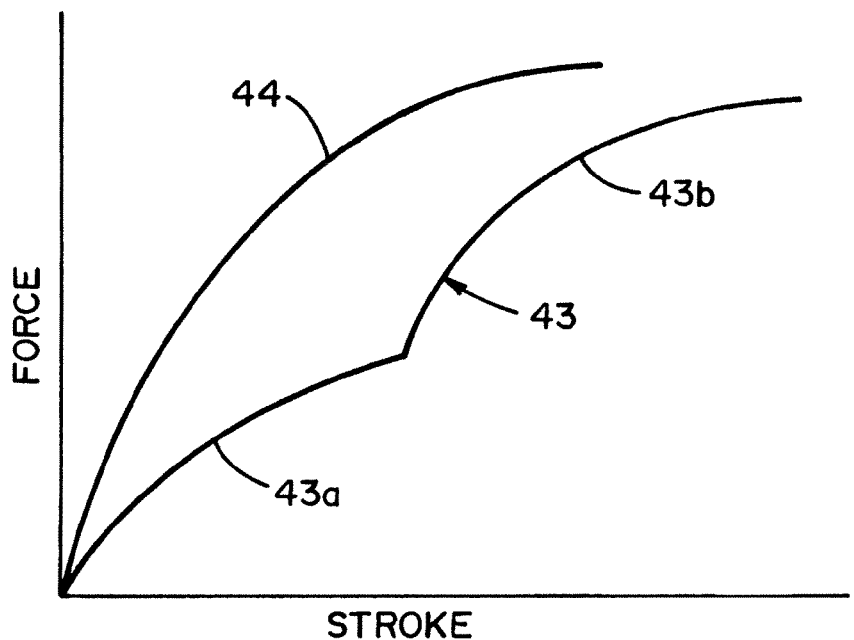
FIG. 3 is a stroke versus force graph showing the force transmitted to or by a U-shaped member of the knee bolster of FIG. 1 for a first lower contact location and a second upper contact location.

FIG. 3 illustrates a stroke versus force graph for the knees K and K' impacting and deforming the knee bolster 10. As shown, curve 43 corresponds to the knee K' of a smaller or shorter occupant impacting the knee panel member 18 at or near the lower portion 18a and curve 44 represents the knee K of a larger or taller occupant impacting the knee panel member 18 at or near the upper portion 18b. With the ribs 32, such as ribs 32a, 32b, being more spaced apart adjacent the lower portion 18a, the knee bolster 10 exhibits a two-step deformation when the knee K' impacts the knee panel member 18. In particular, lower curve portion 43a represents the knee panel member 18 deforming or crushing and upper curved portion 43b represents the knee K' continuing to stroke into the knee bolster 10 and be resisted by the curved bracket 16. Curve 44 represents the knee K of a larger or taller occupant impacting the knee bolster 10 at or near the upper portion 18b. As shown, the curve 44 is relatively smooth as the higher concentration of ribs 32, such as ribs 32c, 32d, near the upper portion 18b causes impacting force from the knee K to be transmitted to and resisted by the curved bracket 16 (i.e., there is no two-step deformation).

Figure 4:
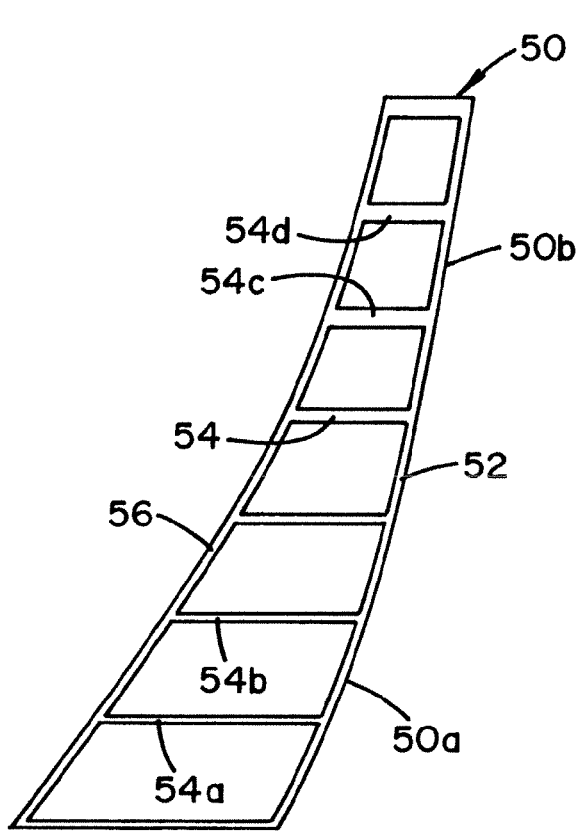
FIG. 4 is a cross-sectional view of a secondary member for a knee bolster according to an alternate exemplary embodiment.

With reference to FIG. 4, a knee panel member or secondary member 50 is illustrated according to an alternate embodiment. The knee panel member 50 can be substituted for the knee panel member 18 of FIG. 2 for use in the knee bolster 10. Like the knee panel member 18, the knee panel member 50 can exhibit a variable load response for a contact location when the contact location varies between a lower portion 50a of the knee panel member 50 and an upper portion 50b of the knee panel member. The knee panel member 50 can include a contact wall 52 spanning between the lower and upper portions 50a, 50b for receiving an impact force at the contact location. The knee panel member 50 can further include a plurality of spaced apart ribs 54, which are disposed between the contact wall 52 and the curved bracket 16 when the knee panel member 50 is mounted to the curved bracket 16. A mounting wall 56 is spaced apart from the contact wall 52 and can be secured to curved bracket 16 when the knee panel member 50 is substituted for knee panel member 18 of knee bolster 10. The ribs 54, which extend between the contact and mounting walls 52, 56, are configured to provide the knee panel member 50 with the variable load response.

In particular, the ribs 54 can have varying thicknesses to provide a higher load response at the upper portion 50b and a lower load response at the lower portion 50a. In the illustrated embodiment, the varying thickness of the ribs 54 progressively varies with thinner ribs (e.g., ribs 54a, 54b) adjacent the lower portion 50a and thicker ribs (e.g., 54c, 54d) adjacent the upper portion 50b. The thicker ribs, such as ribs 54c, 54d, provide an increased stiffness or strength at or toward the upper portion 50b, whereas the thinner ribs, such as ribs 54a, 54b, at or toward the lower portion 50a provide reduced stiffness or strength. Having the ribs 54 configured by varying the thicknesses thereof such that the ribs 54c, 54d adjacent the upper portion have a greater thickness than the ribs 54a, 54b adjacent the lower portion 50a functions similarly to the panel member 18 in that a higher load response from a knee K of a larger or taller person is provided by the upper portion 50b and a lower load response, such as from a knee K' of a smaller or shorter person, is provided by the lower portion 50a. The ribs 54 of the illustrated knee panel member 50 are spaced equal distances apart, though this is not required.

Figure 5:
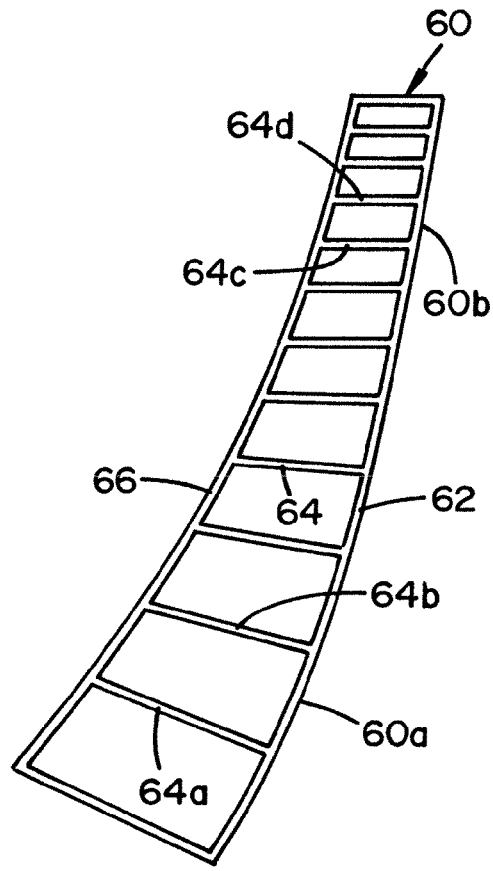
FIG. 5 is a cross-sectional view of a secondary member for a knee bolster according to another alternate exemplary embodiment.

With reference to FIG. 5, another alternate knee panel member 60 is illustrated for exhibiting a variable load response for a contact location when the contact location varies between a lower portion 60a of the knee panel member 60 and an upper portion 60b of the knee panel member 60. Like the knee panel members 18, 50, the knee panel member 60 includes a contact wall 62 spanning between the lower and upper portions 60a, 60b for receiving an impact force at a contact location. The knee panel member 60 further includes a plurality of spaced apart ribs 64, which are disposed between the contact wall 62 and the curved bracket 16 when the knee panel member 60 is substituted for the knee panel member 18 in the knee bolster 10. A mounting wall 66 is spaced apart from the contact wall 62 and is secured to the curved bracket 16. As shown, the ribs 64 extend between the contact and mounting walls 62, 66. In the knee panel member 60, the ribs 64 are configured to increase stiffness or strength of the upper portion 60b relative to the lower portion 60a to provide the variable load response for the knee panel member 60.

In particular, the ribs 64 are configured by varying an angular orientation of the ribs 64. By varying the angular orientations of the ribs 64, a higher load response can be provided at the upper portion 60b and a lower load response can be provided at the lower portion 60a. In particular, the ribs adjacent the lower portion, such as ribs 64a, 64b, are oriented at a greater angle relative to a horizontal impact force (e.g., force 42) provided by knee K' and ribs adjacent the upper portion 60b, such as ribs 64c, 64d, have an angular orientation relative to horizontal impact force (e.g., force 40) that is less than the ribs adjacent the lower portion 60a. In the illustrated embodiment, the ribs adjacent the upper portion 60b, including ribs 64c, 64d, have no angular orientation relative to a force expected to be transmitted by a knee K at the upper portion 60b (i.e., no angular orientation relative to the force shown by arrow 40). Accordingly, the ribs 64c, 64d adjacent the upper portion 60b are angled less relative to a direction of a expected impact force than the ribs 64a, 64b adjacent the lower portion 60a. In the illustrated embodiment, the angular orientation of the ribs 64 generally increases progressively from the upper portion 60b to or toward the lower portion 60a.

The knee panel members 18, 50, 60 illustrate exemplary knee panel members for use in the knee bolster 10. The ribs of these knee panel members are configured by varying at least one of a spacing (knee panel member 18 of FIG. 2), a thickness (knee panel member 50 of FIG. 4) or an angular orientation (knee panel member 60 of FIG. 5) between the ribs adjacent the upper portion and the ribs adjacent the lower portion, wherein such varying is progressive along a height of the knee panel member. As should be understood and appreciated by those skilled in the art, other configurations for the knee panel member in the knee bolster 10 are possible. For example, a knee panel member can be constructed without progressively varying spacing, thickness, or angular orientations. Alternatively, combinations of the knee panel members illustrated herein can be employed. For example, a knee panel member can be constructed to include varying spacing and/or varying thicknesses and/or varying angular orientations. Moreover, a particular spacing, thicknesses, and angular orientations used in a particular knee panel member can be modified so as to change the particular characteristics of the knee panel member exhibited at particular contact locations therealong.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A knee bolster for mounting within a vehicle, comprising:
   a curved bracket mounted to an associated cross beam of the vehicle; and
   a knee panel member mounted to said curved bracket at a location spaced from the associated cross beam, said knee panel member exhibiting a variable load response for a contact location when said contact location varies between a lower portion of said knee panel member and an upper portion of said knee panel member, wherein said upper portion is an upper half of the knee panel member that exhibits a higher load response and said lower portion is a lower half of the knee panel member that exhibits a lower load response.

2. The knee bolster of claim 1 further including:
   a mounting wall spaced apart from said contact wall and secured to said curved bracket, said plurality of ribs extending between said contact wall and said mounting wall.

3. The knee bolster of claim 1 wherein said curved bracket is metallic and said knee panel member is plastic.

4. A knee bolster for mounting within a vehicle, comprising:
   a curved bracket mounted to an associated cross beam of the vehicle;
   a knee panel member mounted to said curved bracket at a location spaced from the associated cross beam, said knee panel member exhibiting a variable load response for a contact location when said contact location varies between a lower portion of said knee panel member and an upper portion of said knee panel member, wherein said knee panel member includes:
      a contact wall spanning between said lower and upper portions for receiving an impact force at said contact location, and
      a plurality of spaced apart ribs disposed between said contact wall and said curved bracket, said plurality of ribs configured to provide said knee panel member with said higher load response at said upper portion and said lower load response at said lower portion, wherein said plurality of ribs have variable spacing therebetween such that at least two of said plurality of ribs adjacent said lower portion are spaced apart a greater distance than at least another two of said plurality of ribs adjacent said upper portion, and wherein said plurality of ribs are distributed along said knee panel member and spacing between adjacent ones of said plurality of ribs progressively decreases continuously along an entire vertical extent of the knee panel member.

5. A knee bolster for mounting within a vehicle, comprising:
   a curved bracket mounted to an associated cross beam of the vehicle;
   a knee panel member mounted to said curved bracket at a location spaced from the associated cross beam, said knee panel member exhibiting a variable load response for a contact location when said contact location varies between a lower portion of said knee panel member and an upper portion of said knee panel member, wherein said knee panel member includes:
- a contact wall spanning between said lower and upper portions for receiving an impact force at said contact location, and
- a plurality of spaced apart ribs disposed between said contact wall and said curved bracket, said plurality of ribs configured to provide said knee panel member with said higher load response at said upper portion and said lower load response at said lower portion, wherein said plurality of ribs have varying thicknesses to provide a higher load response at said upper portion and a lower load response at said lower portion, wherein each thickness is measured perpendicular to a longest dimension of the respective rib, and wherein said varying thicknesses of said plurality of ribs progressively varies with thinner ribs adjacent said lower portion and thicker ribs adjacent said upper portion.

6. The knee bolster of claim 5 wherein a higher concentration of said plurality of ribs is disposed adjacent said upper portion than said lower portion and wherein said upper portion is bound at an uppermost edge of the knee panel member.

7. A knee bolster for mounting within a vehicle, comprising:
a curved bracket mounted to an associated cross beam of the vehicle;
a knee panel member mounted to said curved bracket at a location spaced from the associated cross beam, said knee panel member exhibiting a variable load response for a contact location when said contact location varies between a lower portion of said knee panel member and an upper portion of said knee panel member, wherein said knee panel member includes:
- a contact wall spanning between said lower and upper portions for receiving an impact force at said contact location, and
- a plurality of spaced apart ribs disposed between said contact wall and said curved bracket, said plurality of ribs configured to provide said knee panel member with said higher load response at said upper portion and said lower load response at said lower portion, wherein said plurality of ribs have varying angular orientations relative to a horizontal axis to provide a higher load response at said upper portion and a lower load response at said lower portion, and wherein an uppermost rib of said plurality of ribs is parallel to said horizontal axis.

8. A vehicle knee bolster comprising:
a cross member extending laterally across a vehicle;
a U-shaped member having a first leg secured to the cross member;
a secondary member secured to a second leg of said U-shaped member, said secondary member having an upper half, which is nearer an uppermost edge of said secondary member as compared to a lowermost edge of said secondary member, and a lower half, which is adjacent said lowermost edge as compared to said uppermost edge, with stiffness varying between said upper and lower halves, and wherein said secondary member includes a plurality of ribs extending transversely in a direction generally parallel to said cross member, said ribs spaced apart from one another and configured to increase stiffness of said upper half relative to said lower half.

9. The vehicle knee bolster of claim 8 wherein said upper half has an increased stiffness relative to said lower half, said upper half transmitting more of an impact load to said U-shaped member when said impact load is received on said upper half and said lower half transmitting less of said impact load to said U-shaped member when said impact load is received on said lower half.

10. The vehicle knee bolster of claim 8 wherein said ribs are configured by varying a spacing between adjacent ribs such that said ribs adjacent said upper half are spaced apart less than said ribs adjacent said lower half.

11. The vehicle knee bolster of claim 8 wherein said ribs are configured by varying an angular orientation of each of said ribs such that said ribs adjacent said upper half are angled less relative to a direction of a generally horizontal impact force than said ribs of said lower half.

12. The vehicle knee bolster of claim 8 wherein said ribs are configured by varying at least one of a spacing, a thickness or an angular orientation between said ribs adjacent said upper half and said ribs adjacent said lower half, said varying being progressive along a height of said secondary member.

13. The vehicle knee bolster of claim 8:
wherein said ribs are configured by varying a thickness of said ribs such that said ribs adjacent said upper half have a greater thickness than said ribs adjacent said lower half, wherein the thickness is measured perpendicular to a longest dimension of the respective rib.

14. A vehicle knee bolster, comprising:
a cross member extending laterally across a vehicle;
a U-shaped member having a first leg secured to the cross member; and
a secondary member secured to a second leg of said U-shaped member, said secondary member having an upper portion and a lower portion, with stiffness varying between said upper and lower portions,
wherein said secondary member includes a plurality of ribs extending transversely in a direction generally parallel to said cross member, said ribs spaced apart from one another and configured to increase stiffness of said upper portion relative to said lower portion, and further wherein said ribs are configured by varying a thickness of said ribs such that said ribs adjacent said upper portion have a greater thickness than said ribs adjacent said lower portion.

15. A knee bolster, comprising:
a curved member having one end secured to a cross member and a second end spaced apart from the cross member; and
a secondary member secured to said second end of said curved member, the secondary member having variable strength along an entire extent of a generally vertical dimension thereof to transmit a corresponding varying load to said curved member when an impact force is received by said secondary member, wherein said secondary member includes reinforcing ribs that provide increased strength at an uppermost portion of the secondary member, which is nearer an uppermost edge of said secondary member as compared to a lowermost edge of said secondary member, and reduced strength at a lowermost portion of the secondary member, which is nearer said lowermost edge as compared to said uppermost edge.

16. The knee bolster of claim 15 wherein the ribs have a varying thickness relative to one another wherein each thickness is measured generally along a vertical axis.

17. The bolster of claim 15 wherein said reinforcing ribs provide increased strength at an uppermost rib of the secondary member, which is nearer an uppermost edge of said secondary member as compared to a lowermost edge of said secondary member, and reduced strength at a lowermost rib of the secondary member, which is nearer said lowermost edge as compared to said uppermost edge.

18. A knee bolster for mounting within a vehicle, comprising:
- a curved bracket mounted to an associated cross beam of the vehicle;
- a knee panel member mounted to said curved bracket at a location spaced from the associated cross beam, said knee panel member exhibiting a variable load response for a contact location when said contact location varies between a lower portion of said knee panel member and an upper portion of said knee panel member, and wherein the knee panel member includes a contact wall that is angled acutely relative to a vertical axis along an entire vertical height of the contact wall.

19. A knee bolster comprising:
- a cross member extending laterally across a vehicle;
- a U-shaped member having a first leg secured to the cross member;
- a secondary member secured to a second leg of said U-shaped member, said secondary member having an upper half, which is nearer an uppermost edge of said secondary member as compared to a lowermost edge of said secondary member, and a lower half, which is adjacent said lowermost edge as compared to said uppermost edge, with stiffness varying between said upper and lower halves, and wherein the stiffness along an entirety of the upper half is greater than a stiffness along an entirety of the lower half.

* * * * *